US009650702B2

(12) United States Patent
Pelsoeczy

(10) Patent No.: US 9,650,702 B2
(45) Date of Patent: *May 16, 2017

(54) NITRIDABLE PISTON RINGS

(75) Inventor: Laszlo Pelsoeczy, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 795 days.

This patent is subject to a terminal disclaimer.

(21) Appl. No.: 13/260,476

(22) PCT Filed: Nov. 23, 2009

(86) PCT No.: PCT/EP2009/008334
§ 371 (c)(1),
(2), (4) Date: Dec. 22, 2011

(87) PCT Pub. No.: WO2010/108529
PCT Pub. Date: Sep. 30, 2010

(65) Prior Publication Data
US 2012/0091663 A1  Apr. 19, 2012

(30) Foreign Application Priority Data
Mar. 26, 2009  (DE) ............ 10 2009 015 008

(51) Int. Cl.
| F16J 9/26 | (2006.01) |
| C22C 38/34 | (2006.01) |
| C22C 38/44 | (2006.01) |
| C22C 38/46 | (2006.01) |
| F16J 10/04 | (2006.01) |

(52) U.S. Cl.
CPC ............. *C22C 38/34* (2013.01); *C22C 38/44* (2013.01); *C22C 38/46* (2013.01); *F16J 9/26* (2013.01); *F16J 10/04* (2013.01)

(58) Field of Classification Search
CPC .. F16J 9/26; C22C 38/34; C22C 38/44; C22C 38/46
USPC .................................. 277/434, 443
See application file for complete search history.

(56) References Cited

U.S. PATENT DOCUMENTS

| 3,235,378 A | 2/1966 | Jennings | |
| 3,385,739 A | 5/1968 | Danis | |
| 3,844,848 A * | 10/1974 | Stacey | C22C 38/50 148/599 |
| 3,890,070 A * | 6/1975 | Sasame et al. | 418/178 |
| 3,990,892 A * | 11/1976 | Machi | C22C 38/44 420/37 |
| 4,586,957 A | 5/1986 | Masumoto | |
| 4,966,751 A * | 10/1990 | Kaede | C22C 38/18 148/318 |
| 5,081,760 A | 1/1992 | Kikuhara et al. | |
| 8,240,676 B2 * | 8/2012 | Kariya et al. | 277/434 |
| 8,241,559 B2 * | 8/2012 | Pelsoeczy | 420/117 |
| 8,506,727 B2 * | 8/2013 | Pelsoeczy | 148/221 |
| 8,580,048 B2 * | 11/2013 | Pelsoeczy | 148/221 |
| 8,647,448 B2 * | 2/2014 | Pelsoeczy | 148/325 |
| 2002/0066502 A1 | 6/2002 | Tako et al. | |
| 2006/0191508 A1 * | 8/2006 | Otsuka | B22D 30/00 123/193.6 |
| 2008/0007006 A1 | 1/2008 | Kawai | |
| 2009/0058014 A1 * | 3/2009 | Kariya et al. | 277/442 |
| 2010/0189588 A1 * | 7/2010 | Kawatsu | B23K 35/0266 420/12 |
| 2010/0192895 A1 * | 8/2010 | Pelsoeczy | C22C 38/08 123/193.2 |

FOREIGN PATENT DOCUMENTS

| CN | 1641248 A | 7/2005 |
| CN | 101100963 A | 1/2008 |
| DE | 199 53 311 A1 | 6/2000 |
| DE | 10 2006 038670 A1 | 2/2008 |
| EP | 0278208 A1 | 8/1988 |
| EP | 0295111 A | 12/1988 |
| EP | 0295111 A2 | 12/1988 |
| EP | 1975265 A1 | 10/2008 |
| EP | 1997921 A2 | 12/2008 |
| JP | 56041354 | * 4/1981 |
| JP | 56041354 A | * 4/1981 |
| JP | 59104458 | * 6/1984 |
| JP | 59104458 A | * 6/1984 |

(Continued)

OTHER PUBLICATIONS

JP 56041354 Translation.*
JP 56041354 English Abstract.*
English Language Abstracts for JP 59104458.*
English Language Abstract for JP 56041354.*

*Primary Examiner* — Nicholas L Foster
(74) *Attorney, Agent, or Firm* — Robert L. Stearns; Dickinson Wright, PLLC

(57) ABSTRACT

A steel material composition in particular for manufacturing piston rings and cylinder liners, which has a good nitriding capability, contains the following elements in the given proportion related to 100% by weight of the steel material composition: 0.5-1.2% by weight C, 4.0-20.0% by weight Cr, 45.30-91.25% by weight Fe, 0.1-3.0% by weight Mn, 0.1-3.0% by weight Mo, 2.0-12.0% by weight Ni, 2.0-10.0% by weight Si and 0.05-2.0% by weight V. It can be manufactured by manufacturing a melt of the starting materials and casting the melt into a prefabricated mold. Nitridation of the steel material composition which is obtained leads to a nitridized steel material composition which, by virtue of the manufacture with gravity casting, exceeds the properties of tempered cast iron with nodular graphite.

8 Claims, No Drawings

(56) References Cited

FOREIGN PATENT DOCUMENTS

| | | | |
|---|---|---|---|
| JP | S6479348 A | 3/1989 | |
| JP | 01 205063 A | 8/1989 | |
| JP | 03122257 A | 5/1991 | |
| JP | 05132738 A | 5/1993 | |
| JP | H06145912 A | 5/1994 | |
| JP | 2981899 B2 | 11/1999 | |
| JP | 2004216413 A | 8/2004 | |
| JP | H01119646 A | 5/2011 | |
| KR | 1020050113624 A | 12/2005 | |
| WO | WO 03/098079 A | 11/2003 | |
| WO | WO 2007/099968 | * | 9/2007 |
| WO | 2008019717 A1 | 2/2008 | |
| WO | WO 2008/018128 | * | 2/2008 |

* cited by examiner

NITRIDABLE PISTON RINGS

BACKGROUND OF THE INVENTION

1. Technical Field

The present invention relates to piston rings which have good nitridability. Furthermore, the present invention relates to a nitride piston ring which can be manufactured from the piston ring with good nitridability of the invention. In addition, the present invention relates to a process for the manufacture of the piston ring with good nitridability of the invention and to a process for the manufacture of the nitride piston rings in accordance with the invention.

2. Related Art

In an internal combustion engine, piston rings seal the gap between the piston head and the cylinder wall of the combustion chamber. As the piston moves back and forth, one side of the piston ring slides with its outer circumferential surface against the cylinder wall in a permanently spring-loaded position, and because of the tilting movements of the piston, the other side of the piston ring slides in an oscillating manner in its piston ring groove, whereupon its flanks bear alternately on upper or lower groove flanks of the piston ring groove. The mutual sliding of these components against each other results in a greater or lesser amount of wear, depending on the material, if it runs dry, this can lead to so-called fretting, scoring and finally destruction of the engine. In order to improve the slide and wear behaviour of the piston rings against the cylinder wall, their circumferential surface has been provided with coatings formed from various materials.

In order to produce high performance internal combustion engine parts, such as piston rings, cast iron materials or cast iron alloys are usually used. In high performance engines, the requirements placed upon piston rings, in particular compression rings, are becoming ever more stringent, for example as regards peak compressive pressure, combustion temperature, EGR and lubricant film reduction, which substantially affect their functional properties such as wear, scorch resistance, micro-welding and corrosion resistance.

Prior art cast iron materials, however, are at great risk of breaking; in fact, when using current materials, the rings frequently break. Increased mechanico-dynamic loads result in shorter service lifetimes for piston rings. Severe wear and corrosion occurs on the running faces and flanks.

Higher ignition pressures, reduced emissions and direct fuel injection mean increased loads on the piston rings. This results in damage and a build-up of piston material, especially on the lower piston ring flank.

Because of the higher mechanical and dynamic stresses on piston rings, more and more engine manufacturers are demanding piston rings from high-grade steel (hardened and tempered and high alloy, such as grade 1.4112, for example). Ferrous materials containing less than 2.08 weight % of carbon are herein known as steel. If the carbon content is higher, it is known as cast iron. Compared with cast iron, steels have better strength and toughness properties as there is no interference from free graphite in the basic microstructure.

Usually, high chrome alloyed martensitic steels are used for the manufacture of steel piston rings. However, using such steels suffers from the disadvantage that the manufacturing costs are significantly higher than those of cast iron components.

Steel piston rings are manufactured from profiled wire. The profiled wire is coiled into a circular shape, cut and pulled over a "non-round" mandrel. The piston ring attains its desired non-round shape on this mandrel by means of an annealing process, which imparts the required tangential forces. A further disadvantage of the manufacture of piston rings from steel is that beyond a certain diameter, ring manufacture (coiling) from steel wire is no longer possible. Piston rings formed from cast iron, on the other hand, are already non-round when cast, so that from the outset they have an ideal shape.

Cast iron has a substantially lower melting point than steel. The difference may be up to 350° C., depending on the chemical composition. Thus, cast iron is easier to melt and to cast, since a lower melting point means the casting temperature is lower and thus the shrinkage on cooling is smaller, and so the cast material has fewer pipe defects or heat and cold cracking. A lower casting temperature also results in a lower stress on the material of the mould (erosion, gas porosity, sand inclusions) and the furnace and also results in lower melting costs.

The melting point of a ferrous material does not simply depend on the carbon content, but also on its "degree of saturation". The following empirical formula applies:

$$S_c = C/(4.26 - 1/3(Si+P))$$

The closer the degree of saturation is to 1, the lower is the melting point. For cast iron, a degree of saturation of 1.0 is usually desirable, whereupon the cast iron has a melting point of 1150° C. The degree of saturation of steel is approximately 0.18, depending on the chemical composition. Eutectic steel has a melting point of 1500° C.

The degree of saturation can be substantially influenced by the Si or P content. As an example, a 3 weight % higher silicon content has a similar effect to a 1 weight % higher C content. Thus, it is possible to manufacture a steel with a C content of 1 weight % and 9.78 weight % silicon content which has the same melting point as cast iron with a degree of saturation of 1.0 (C: 3.26 weight %; Si: 3.0 weight %).

A drastic increase in the Si content can raise the degree of saturation of the steel and reduce the melting point to that for cast iron. Thus, it is possible to manufacture steel with the aid of the same technology that is used for the manufacture of cast iron, for example GOE 44.

Piston rings formed from high silicon cast steel are known in the art. However, the silicon present in larger quantities has a negative influence on the hardenability of the material since its austenite transition temperature, "Ac3", is increased.

A process that is normal in the art for nevertheless increasing the hardness of the piston ring surface could consist in nitriding the material. However, it has been shown that prior art high silicon steel castings have poor nitridability.

SUMMARY OF THE INVENTION

Thus, the aim of the invention is to provide piston rings, which have a high silicon composition and the main body and which have good nitridability, as well as nitride piston rings. Upon manufacture by gravity casting, the properties of the nitrided steel composition of the nitride piston rings should surpass the properties of hardened and tempered spheroidal graphite cast iron in at least one of the following points:
  mechanical properties such as elastic modulus, bending strength;
  break strength;
  form stability;
  wear on the flanks;
  wear on the running surfaces.

DETAILED DESCRIPTION

In accordance with the invention, this aim is achieved by means of piston rings which as the main body have a steel composition which contains the following elements in the following proportions:

| C:  | 0.5-1.2     | weight % |
|-----|-------------|----------|
| Cr: | 4.0-20.0    | weight % |
| Fe: | 45.30-91.25 | weight % |
| Mn: | 0.1-3.0     | weight % |
| Mo: | 0.1-3.0     | weight % |
| Ni: | 2.0-12.0    | weight % |
| Si: | 2.0-10.0    | weight % |
| V:  | 0.05-2.0    | weight % |
| B:  | max 0.5     | weight % |
| Cu: | max 2.0     | weight % |
| Nb: | max 0.05    | weight % |
| P:  | max 0.01    | weight % |
| Pb: | max 0.05    | weight % |
| S:  | max 0.05    | weight % |
| Sn: | max 0.05    | weight % |
| Ti: | max 0.2     | weight % |
| W:  | max 0.5     | weight % |

Wherein the steel composition contains only elements selected from the group consisting of C, Cr, Cu, Fe, Mn, Mo, Nb, Ni, P, Pb, S, Si, Sn, Ti, V and W, the sum of said elements being 100 wt %.

It is assumed that the good nitridability of the piston rings of the invention is due to the 4.0-20.0 weight % chromium content. In the nitriding process, chromium forms very hard nitrides. While adding chromium to a steel composition would normally raise the austenite transition temperature of the material further and thus would cause its hardenability to deteriorate further, in the present invention it was observed that adding 2.0-12.0 weight % of nickel counteracts this rise in the austenite transition temperature.

In this manner, the invention prevents an increase in the austenite transition temperature from nullifying the better hardenability of the surface of the material obtainable because of the improved nitridability of the steel composition by means of a simultaneous reduction in the hardenability of the main body.

Nitriding the piston rings with good nitridability of the invention produces nitride piston rings in accordance with the invention.

The nitrided piston rings of the invention have a reduced tendency to change their shape when heated strongly, and thus ensures long-term high performance and, moreover, reduced oil consumption.

The nitrided piston rings of the invention also have the advantage that they can be manufactured using machinery and technology for manufacturing cast iron parts. In addition, the manufacturing costs correspond to those of cast iron piston rings, providing cost savings for the manufacturer and improving margins. Similarly, the material parameters can be adjusted independently of the supplier.

Piston rings in accordance with the invention are manufactured in a process which comprises the following steps:
a. producing a molten mass from the starting materials; and
b. casting the molten mass into a prepared mould.

Examples of starting materials are steel scrap, return scrap and alloying substances. The melting process is carried out in a furnace, preferably a cupola furnace. Next, a blank is produced when the melt solidifies. The piston ring can thus be cast using methods that are known in the art, for example by centrifugal casting processes, continuous casting processes, die stamping processes, Croning processes or, as is preferable, green sand moulding.

After the piston ring has cooled, the mould is emptied and the blank obtained is cleaned.

If necessary, the piston ring may then be quenched and tempered. The following steps accomplish this:

c. austenitization of the piston ring above its Ac3 temperature;
d. quenching the piston ring in a suitable quenching medium, and
e. tempering the piston ring at a temperature in the range 400° C. to 700° C. in a controlled atmosphere furnace.

Preferably, oil is used as the quenching medium.

In order to manufacture a nitride piston ring in accordance with the invention, following the process steps mentioned above, nitriding of the piston ring obtained is carried out.

This can, for example, be accomplished by gas nitriding, plasma nitriding or pressure nitriding.

The following example illustrates the invention without limiting it.

EXAMPLE

A piston ring was manufactured from a highly nitridable steel composition in accordance with the invention having the following composition:

| B:  | 0.001 weight % | Pb: | 0.16  weight % |
|-----|----------------|-----|----------------|
| C:  | 0.7   weight % | S:  | 0.009 weight % |
| Cr: | 18.0  weight % | Si: | 3.0   weight % |
| Cu: | 0.05  weight % | Sn: | 0.001 weight % |
| Mn: | 0.45  weight % | Ti: | 0.003 weight % |
| Mo: | 1.05  weight % | V:  | 0.11  weight % |
| Nb: | 0.002 weight % | W:  | 0.003 weight % |
| Ni: | 3.15  weight % | Fe: | remainder      |

It was obtained by producing a molten mass from the starting materials (steel scrap, return scrap and alloying substances) and casting the melt into a prepared green sand mould.

Next, the mould was emptied and the piston ring obtained was cleaned. The piston ring was then quenched and tempered. This was accomplished by austenitization above the Ac3 temperature of the steel composition, quenching in oil and tempering at a temperature in the range 400° C. to 700° C. in a controlled atmosphere furnace.

Finally, the surface of the piston ring obtained was nitrided. In the nitrided regions, a hardness of more than 1000 HV was obtained, which guaranteed a high resistance to flank wear and running face wear. The hardness in this case was determined in accordance with DIN 6773.

The invention claimed is:

1. A piston ring having a main body fabricated of a steel composition comprising the following elements in the proportions given, expressed with respect to 100 weight % of the steel composition:

| C:  | 0.5-1.2             | weight % |
|-----|---------------------|----------|
| Cr: | 4.0-20.0            | weight % |
| Mn: | 0.1-3.0             | weight % |
| Mo: | 0.1-3.0             | weight % |
| Ni: | 3.15 to less than 12.0 | weight % |

-continued

| | | |
|---|---|---|
| Si: | 3.0-10.0 | weight % |
| V: | 0.05-2.0 | weight % |
| B: | max 0.001 | weight % |
| Cu: | max 2.0 | weight % |
| Nb: | 0.002 to 0.05 | weight % |
| P: | max 0.01 | weight % |
| Pb: | max 0.05 | weight % |
| S: | max 0.05 | weight % |
| Sn: | max 0.05 | weight % |
| Ti: | max 0.2 | weight % |
| W: | max 0.5 | weight %, and |
| Fe: | | remainder, | wherein the steel composition contains only elements selected from the group consisting of B, C, Cr, Cu, Fe, Mn, Mo Nb, Ni, P, Pb, S, Si, Sn, Ti, V and W, the sum of said elements being 100 wt %; and the steel composition is nitrided.

2. The piston ring according to claim 1, wherein the proportion of Cu is from 0.05 to 2.0 weight %.

3. The piston ring according to claim 1, wherein the proportion of C is from 0.7 to 1.2 weight %.

4. The piston ring according to claim 1, wherein the proportion of Cr is from 4.0 to 18.0 weight %.

5. A method for making a piston ring comprising the following steps:

a. producing a molten mass from a steel composition comprising:

| | | |
|---|---|---|
| C: | 0.5-1.2 | weight % |
| Cr: | 4.0-20.0 | weight % |
| Mn: | 0.1-3.0 | weight % |
| Mo: | 0.1-3.0 | weight % |
| Ni: | 3.15 to less than 12.0 | weight % |
| Si: | 3.0-10.0 | weight % |
| V: | 0.05-2.0 | weight % |
| B: | max 0.001 | weight % |
| Cu: | max 2.0 | weight % |
| Nb: | 0.002 to 0.05 | weight % |
| P: | max 0.01 | weight % |
| Pb: | max 0.05 | weight % |
| S: | max 0.05 | weight % |
| Sn: | max 0.05 | weight % |
| Ti: | max 0.2 | weight % |
| W: | max 0.5 | weight %, and |
| Fe: | | remainder, | b. casting the molten mass into a prepared mold to obtain a piston ring; and c. nitriding the steel composition of the piston ring.

6. The method according to claim 1, wherein the proportion of Cu is from 0.05 to 2.0 weight %.

7. The method according to claim 5, wherein the proportion of C is from 0.7 to 1.2 weight %.

8. The method according to claim 5, wherein the proportion of Cr content is from 4.0 to 18.0 weight %.

* * * * *